Dec. 14, 1943. D. LA BARRE 2,336,791
WELDABLE NUT AND METHOD OF ATTACHMENT
Filed April 9, 1942
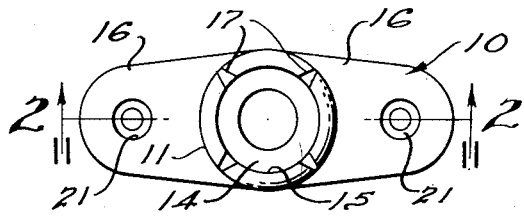
Fig. 1.
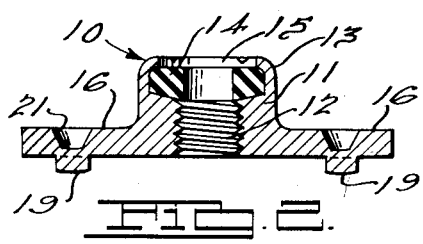
Fig. 2.
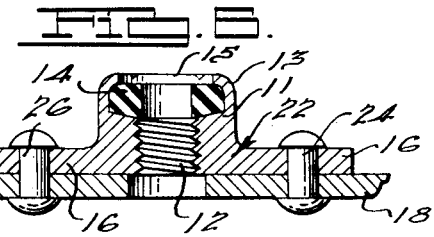
Fig. 6.
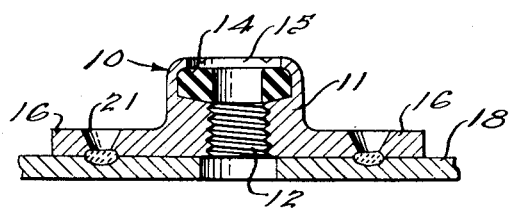
Fig. 3.
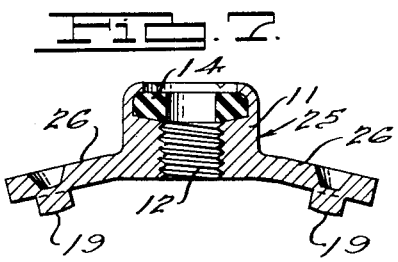
Fig. 7.
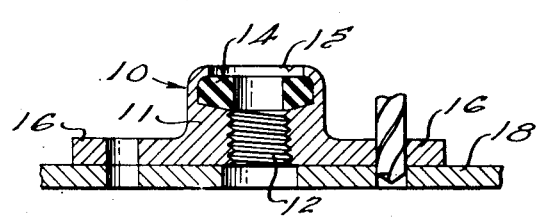
Fig. 4.
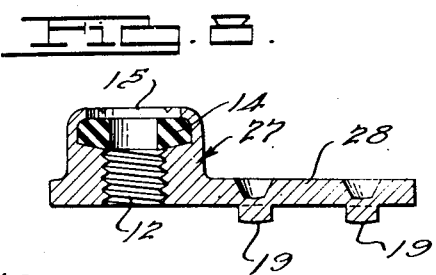
Fig. 8.
Fig. 5.
INVENTOR
Dwight LaBarre.
BY Harness, Dickey & Pierce
ATTORNEYS.

Patented Dec. 14, 1943

2,336,791

UNITED STATES PATENT OFFICE 2,336,791

WELDABLE NUT AND METHOD OF ATTACHMENT

Dwight La Barre, Birmingham, Mich., assignor, by mesne assignments, to Elastic Stop Nut Corporation, Union, N. J., a corporation of New Jersey Application April 9, 1942, Serial No. 438,249

7 Claims. (Cl. 10—86)

The present invention relates to weldable nuts and has particular reference to weldable anchor nuts, that is, nuts having one or more flanges projecting from the base of the nut body and adapted to be welded to a supporting surface.

Anchor nuts of various sizes and types are extensively used in large quantities on removable parts for vehicles, aircraft and other machines and devices. Particularly in the aircraft industry such nuts are used in large quantities by being attached to supporting members of thin sheet metal. When first used in this industry, anchor nuts were substantially invariably secured by rivets passing through suitably punched holes in the anchoring flange or flanges and in the commercial development of the use of nuts of this type certain standards of dimensions such as flange size, spacing of rivet holes relative to each other and to the bore of the nut, etc., have been developed, particularly in respect of nuts to be used in the construction of military aircraft. For such aircraft rigid specifications are prepared by the proper military authorities and must be strictly adhered to by the manufacturers.

In many instances it was found that due to inaccessibility, or other factors, attachment of the nuts by riveting was not advantageous and spot welding was resorted to in such instances. Experience with spot welding showed that it was necessary when employing ordinary spot welding methods to make the anchoring flanges larger than were required for a riveted nut. This led to the development of special anchor nuts for welding and large quantities of these welded nuts went into use.

Only after welded anchor nuts had gone into extensive use and had been in service for a considerable time was it discovered that as used these nuts introduced a difficulty of major proportions. For a variety of reasons, as for instance stripping of threads by accident, it becomes necessary in service from time to time to remove anchor nuts from the structure to which they are attached and it was found that with the forms of welded anchor nuts heretofore employed, removal of a nut from a thin plate structure could not be effected without so damaging the plate that the latter would have to be patched before a replacement nut could be attached. Because of this difficulty the use of spot welded anchor nuts as heretofore constituted has been definitely restricted and such use has been officially disapproved for certain applications in United States military aircraft.

The primary object of the present invention is to provide a novel and improved form of weldable anchor nut, attachable by projection welding, which will overcome the above noted major deficiency of welded anchor nuts as heretofore manufactured and used, and which will permit of the welded nut being readily removed from its supporting structure without damage to the latter and in a manner such that a replacement nut of standard dimensions and of the riveted type may readily be substituted for the removed welded nut.

Other and more detailed objects will appear as this description proceeds.

In accordance with the invention, each anchoring flange is deformed to produce extensions of small transverse dimensions projecting from the flange on the side to be welded. Advantageously, this deformation is accomplished by punching with a small diameter punch to produce cylindrical extensions of small diameter. These extensions are further, in accordance with the most advantageous exercise of the invention, located so that their position relative to each other and to the bore of the nut corresponds to the position of the rivet holes in standardized anchor nuts of the rivet type. The operation which forms the desired extensions on the side of the flange to be welded results in the production of small recesses on the opposite or exposed side of the flange, which recesses are in alignment with the extensions. Due to the small area of the projections, projection spot welding of a nut to a supporting structure results in relatively very small welded areas, which, however, are adequate for the purpose. Moreover, these small welded areas are definitely located in predetermined positions rather than being randomly located as have been the welds heretofore made. Consequently, if the depressions or recesses in the exposed face of the flange are used as centers for a drill, the nut is readily removable by drilling through the flange and supporting structure at the predetermined spots to thereby cut through the welded areas. Since the welded areas are small, a drill of a size suitable to provide a hole in the supporting structure for a standard size rivet is sufficient to entirely remove the weld. Obviously, the drilling out of the welds in the manner above indicated does not adversely affect the supporting plate structure and leaves that structure with holes through it of a diameter suitable for the reception of rivets and so located that a standard nut of rivet type can be substituted in place of the removed nut and riveted into place without further operations. When the nuts are rust-proofed or coated with insulating or other extraneous material the ends of the extensions are made conductive so as to permit projection spot welding, by the removal of such materials in any desired fashion which may be relatively simple owing to the exposed position of the areas to be cleaned.

For a better understanding of the details of the invention and the advantages to be derived from its use reference may best be had to the following description taken in conjunction with the accompanying drawing in which:

Fig. 1 is a plan view of a flanged nut, having extensions punched thereon, which embodies features of my invention;

Fig. 2 is a sectional view of the nut illustrated in Fig. 1, taken on the line 2—2 thereof;

Fig. 3 is a view of a nut, similar to that illustrated in Fig. 2, but of standard apertured rivet type, adapted to be employed as a replacement nut;

Fig. 4 is a view of the nut illustrated in Fig. 2 after a welding operation;

Fig. 5 is a view of the structure illustrated in Fig. 4 with the welded areas drilled from the nut and the sheet to which the nut was attached;

Fig. 6 is a view of the nut illustrated in Fig. 3 employed as a replacement for the nut illustrated in Fig. 5 when secured in position by rivets;

Fig. 7 is a view of a nut similar to that illustrated in Fig. 2 with the flanges disposed at an angle; and Fig. 8 is a view of a nut, similar to that illustrated in Fig. 2, with the flange extending on one side thereof.

In Fig. 1 a flanged nut 10 is illustrated comprising a central projecting body portion 11 having an internal thread 12 from which a cylindrical projection 13 extends. A locking washer 14 of fiber or other suitable material is disposed within the cylindrical projection 13 which is flanged over at 15 by being crimped at various portions illustrated at 17 to secure the locking washer 14 in position. A pair of lateral extending flanges 16, which are diametrically disposed, are provided at the base of the body portion 11. This portion of the nut is old insofar as my invention is concerned, the nut being secured heretofore by directly spot welding the flanges 16 to a sheet of material 18. As previously pointed out, the difficulty experienced with this nut resulted from the large and randomly located welded area which was produced when the flanges were welded to the sheet. This prevented the nut from being removed without damaging the sheet when for any reason it became necessary to substitute a replacement nut therefor.

In accordance with the present invention, projections, preferably in the form of cylindrical extensions 19, are punched from the top faces of the flanges 16 as illustrated more clearly in Fig. 2, the punch recesses 21 being accurately aligned with the extensions 19 and providing centers for a drill which removes the entire welded area. The projections 19 are small in diameter when compared to the width of the flange which thereby localizes the weld to an area of small diameter. The localization of the welded area, as illustrated in Fig. 4, permits a drill to remove the weld while drilling small apertures in the sheet 18. This is clearly illustrated in Fig. 5. Preferably the size of the projections is such that the weld will be cut out by a drill the diameter of which corresponds to that of the rivet holes of a standard rivet type nut of corresponding size.

An important additional feature of the construction is that the projections 19 and recesses 21 are located with reference to each other and to the threaded nut bore 12, to correspond in spacing to that of the apertures 23 of a rivet type nut of standard dimensions, such as is illustrated in Fig. 3.

With this construction, it will readily be apparent from a consideration of Figs. 2, 3, and 4, that the standard rivet type nut may readily and satisfactorily be employed as a replacement for the original welded nut, as shown in Fig. 6.

In Fig. 7, I have illustrated a nut 25 which is similar to the nut 10 but which differs therefrom by having the pair of diametrically disposed flanges 26 sloping from the nut body 11 at an angle to a normal to the thread axis. In Fig. 8, I have illustrated a nut 27 having a single flange 28 extending from one side of the nut body 11 in which adjacent extensions 19 have been punched. The nuts illustrated in Figs. 7 and 8 have been shown by way of example of the application of the punch projection to flanges which may be disposed in any manner on a nut body for securing the body to a sheet.

In any of the constructions, the localized area of weld permits removal of the nut by drilling the welded area from the nut and sheet when the punched recesses are employed as centers for the drill. The use of punched extensions of small diameter on the flanges of the nut produces localized welded areas which are removed by a drill centered in the punched recess and the nut is separated from the sheet without damaging the sheet. A replacement nut is secured in position by rivets extending through the drilled apertures in the sheet, which are of the same size as the apertures in the replacement nut.

While the advantage of predetermining the location of the projections to correspond to the spacing of standard rivet type nuts will be apparent, it will be evident that the invention is not limited in its application to nuts replaceable only by standard nuts, and embraces all form of article and methods of use falling within the scope of the appended claims, independently of a specific locking feature such as has been disclosed herein by way of illustration, or the absence of such feature.

What I claim is:

1. The combination of a metal plate having an aperture and an anchor nut welded to said plate with the bore of the nut in registry with said aperture, said nut having a threaded body portion and a base portion projecting laterally from said body portion, said base portion having a plurality of drill-guiding indentations in its outer face, and fusion welds of limited area in alignment with said indentations formed by projection welding of material projected from the inner face of said base portion by the formation of said indentations.

2. The combination of a metal plate having an aperture and an anchor nut welded to said plate with the bore of the nut in registry with said aperture, said nut having a threaded body portion and a base portion projecting laterally from said body portion, said base portion having a plurality of drill-guiding indentations in its upper surface, and fusion welds of limited area in alignment with said indentations formed by projection welding of material projected from the inner face of said base portion by the formation of said indentations, said indentations and welds being located with respect to each other and with respect to the bore in said body portion to correspond with the spacing and location of rivet holes in a rivet type anchor nut of standardized construction, whereby to permit the removal of the welded nut from the plate by removal of said welds with a drill centered by said indentations and to permit replacement of the welded nut by a rivet nut of standardized dimensions secured by rivets passing through the holes in said plate formed by the drilling operation required to remove said welds.

3. A nut and plate assembly comprising a metal plate having an aperture and an anchor nut welded to said plate with the bore of the nut registering with said aperture, said nut having a body portion and a base portion projecting laterally therefrom, said base portion having a drill-guiding indentation in its outer face and a fusion weld of limited area in alignment with said indentation formed by projection welding with material projected from the inner face of said base portion by the formation of said indentation.

4. The method of making a nut and plate assembly comprising providing a nut having a lateral attaching flange, forming a drill-guiding indentation in the outer face of the flange portion of the nut, said indentation resulting in a projection on the plate engaging face of said flange, and thereafter projection welding said nut to the surface of the plate to provide welded attachment of limited small area removable by a drill centered by said drill-guiding recess to permit removal of the nut from the plate and the replacement thereof by a riveted type of nut riveted through the aperture in the plate produced by the drilling operation.

5. The method as set forth in claim 4 wherein a plurality of indentations are provided spaced in a predetermined manner relative to the bore of the nut, such spacing corresponding to that of the usual rivet receiving aperture of a conventional nut.

6. An anchor nut for projection welded connection to a metal body, said nut comprising a body portion having a threaded bore for the reception of a threaded structure securing member to be held by the nut, an anchoring flange projecting laterally from the base of the body portion of the nut, and securing means for the welded attachment of said nut to the surface of said metal body comprising a projection of small area on the base surface of said flange, said projection being adapted to be fused by projection welding when the nut is attached to said surface to provide a projection welded area of small dimensions capable of ready removal by a drill, and a drill-guiding indentation in the top face of said flange in alignment with said projection for centering a weld removing drill, said projection and aligned indentation being spaced and located with respect to each other and to the bore in said body portion to correspond to the spacing and location of at least one rivet hole in a rivet anchor nut of standard construction.

7. An anchor nut for projection welded connection to a metal body, said nut comprising a body portion having a threaded bore for the reception of a threaded structure securing member to be held by the nut, an anchoring flange projecting laterally from the base of the body portion of the nut, and securing means for the welded attachment of said nut to the surface of said metal body comprising projections of small area on the base surface of said flange, said projections being adapted to be fused by projection welding when the nut is attached to said surface to provide a projection welded area of small dimensions capable of being removed by a drill, and drill-guiding indentations in the top face of said flange in alignment with said projections for centering a weld removing drill, said projections and aligned indentations being spaced and located with respect to each other and to the bore in said body portion to correspond with the spacing and locations of the rivet holes in a rivet anchor nut of standard construction.

DWIGHT LA BARRE.